Sept. 19, 1967     K. BITTEL     3,342,474

LIQUID SPRINGS

Filed May 28, 1965     2 Sheets-Sheet 1

INVENTOR:
KARL BITTEL

BY Michael J. Striker
his ATTORNEY

Sept. 19, 1967   K. BITTEL   3,342,474
LIQUID SPRINGS
Filed May 28, 1965   2 Sheets-Sheet 2

INVENTOR:
KARL BITTEL
BY
Michael J. Striker
his ATTORNEY

United States Patent Office 3,342,474
Patented Sept. 19, 1967

3,342,474
LIQUID SPRINGS
Karl Bittel, Markkleeberg, near Leipzig, Germany, assignor to VEB Zentrale Entwicklung und Konstruktion Zek Hydraulik, Leipzig, Germany
Filed May 28, 1965, Ser. No. 459,667
8 Claims. (Cl. 267—1)

ABSTRACT OF THE DISCLOSURE

The piston of a liquid spring is formed with an internal chamber which communicates with the chamber of the cylinder. The seal which prevents leakage of liquid from the cylinder chamber comprises a pair of gaskets separated by a washer or sintered metal or cast iron. The gaskets are formed with bores to permit escape of liquid which penetrates to the washer, or with radial channels to collect the liquid which has reached the washer.

A rigid insert is placed into the cylinder chamber to determine the maximum amount of liquid in the two chambers.

The present invention relates to liquid springs, and more particularly to improvements in liquid springs of the type where in a body of compressible liquid is entrapped in a cylinder and undergoes compression resulting in actual reduction in volume when the spring is put to use.

Conventional liquid springs of which I have knowledge at this time are rather complicated and tend to leak in response to elevated pressures. Also, the sealing elements of such conventional springs must be replaced at frequent intervals, and such replacement of sealing elements consumes much time with resultant loss in output of the machine in which the liquid spring is used. Furthermore, known liquid springs are rather bulky so that they cannot be accommodated in all such machines where a liquid spring is desirable but is hard to install because of lack of space Accordingly, it is an important object of the present invention to provide an improved liquid spring which, even though of lightweight and compact construction, can transmit and/or withstand substantial pressures, wherein the sealing structure can withstand long periods of use, and wherein the entrapped compressible liquid may be used to lubricate the parts which move with reference to each other.

Another object of the invention is to provide a liquid spring of the just outlined characteristics which is constructed and assembled in such a way that excessive leakage of entrapped liquid may be determined as soon as it develops whereby the person in charge is immediately apprised of the necessity to replace or to adjust the seals.

A further object of the invention is to provide a liquid spring wherein the initial compression of the entrapped compressible liquid may be adjusted and/or changed without necessitating even partial dismantling of the spring.

An additional object of the instant invention is to provide a novel bearing structure for the piston of a liquid spring which embodies the above outlined features and to construct the piston in such a way that it contributes to improved operation of the spring.

Still another object of the invention is to provide a liquid spring which is particularly useful in heavy-duty machinery, such as hydraulic presses, stamping machines and the like.

A concomitant object of the invention is to provide a liquid spring which may be mounted in any desired position of inclination and wherein the piston may be moved with reference to the cylinder and/or vice versa.

Briefly stated, one feature of my invention resides in the provision of a liquid spring which comprises an openended cylinder member defining a liquid-filled chamber, a hollow piston member reciprocably extending into and defining a liquid-filled chamber which communicates with the chamber of the cylinder member, and annular sealing means interposed between the two members to at least reduce leakage of liquid from the chambers, namely, from the chamber of the cylinder member. The piston member is movable axially with reference to the cylinder member or vice versa to compress the liquid in the chambers, and the thus compressed liquid (usually oil) tends to expand and to return the members into a position in which the pressure prevailing in the chamber is reduced to a minimum.

Due to the fact that the internal chamber of the piston member can accommodate a large supply of compressible liquid, the operating range of the improved liquid seal is substantially greater than the range of a conventional spring having the same dimensions but utilizing a solid rod-shaped piston.

Another feature of the invention resides in the provision of an adjusting device which may be manipulated to change the initial compression of entrapped liquid, and in the provision of specially constructed, assembled and mounted sealing means capable of withstanding pressures which arise when a body of entrapped compressible liquid undergoes compression, for example, when the liquid seal is used in a heavy-duty hydraulic press or another machine tool.

The novel features which are considered as characteristic of the invention are set forth in particular in the appended claims. The improved liquid spring itself, however, both as to its construction and the mode of assembling the same, together with additional features and advantages thereof, will be best understood upon perusal of the following detailed description of certain specific embodiments with reference to the accompanying drawings, in which:

Figure 1:
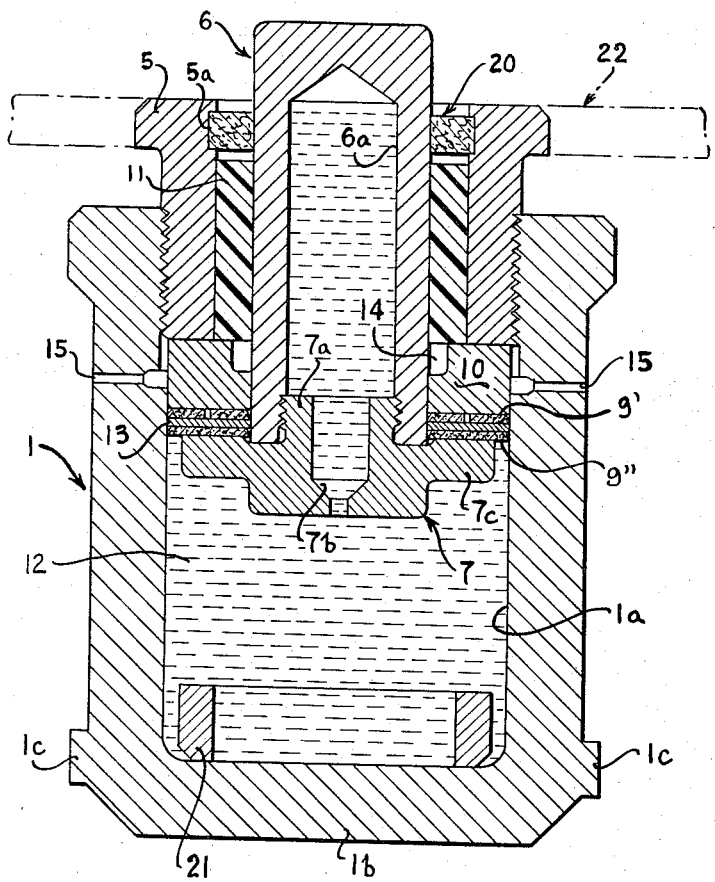
FIG. 1 is an axial section through a liquid spring which embodies one form of my invention.

Referring to FIG. 1, there is shown a liquid spring which comprises a cylinder 1 having an open end which is provided with internal threads to mesh directly with a compression adjusting or regulating device here shown as a screw 5. The screw 5 is of annular shape and receives with clearance a hollow cylindrical piston 6. The open inner end of the piston 6 is formed with internal threads and meshes with the hub 7a of a nozzle 7 defining a liquid-filled flow restricting passage 7b through which a body of oil or another suitable compressible liquid 12 may flow between the internal chamber 1a of the cylinder 1 and the internal chamber 6a of the piston. Both chambers are completely filled with liquid. The screw 5 is rotated when the operator desires to adjust the initial compression of the liquid 12.

Figure 2:
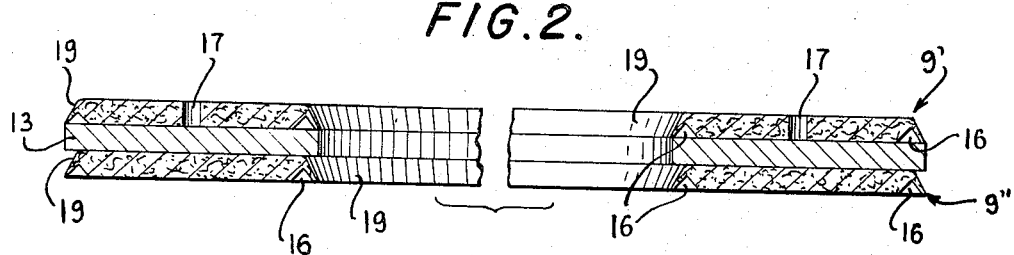
FIG. 2 is an enlarged axial section through a package of annular sealing elements which are utilized in the liquid spring of FIG. 1.

The nozzle 7 can be made as an integral part of the piston 6 and comprises an annular flange 7c which extends radially outwardly beyond the periphery of the median portion of the piston 6 and serves as an abutment or stop for a package of annular sealing elements 9', 9", 13 (see FIG. 2). The uppermost sealing element 9' abuts against a ring-shaped stop 10 which is fitted into the cylinder 1 and abuts against the inner end face of the compression adjusting screw 5. The piston 6 is slidable in a bearing sleeve 11 consisting of polyamide or the like, and this sleeve is telescoped into the screw 5 so that its inner end face abuts against the stop 10.

The package of annular sealing elements includes two gaskets 9', 9" and a spacer element or washer 13 which is interposed between the gaskets. The gaskets 9', 9" are lubricated by liquid contained in an annular collecting compartment 14 defined by the ring 10 and piston 6 at the inner end face of the bearing sleeve 11. The liquid contained in this compartment also lubricates the bearing sleeve 11 when the piston 6 moves axially with reference to the cylinder 1 and/or vice versa. Radially extending bores 15 in the cylinder 1 serve to allow for escape of surplus liquid when the liquid spring is being assembled and also as a means to facilitate detection of leaks when the spring is in actual use.

Referring to FIG. 2, the spacer element or washer 13 preferably consists of cast iron or sintered metal. That side of each gasket 9', 9" which is subjected to the pressure of liquid filling the cylinder chamber 1a is provided with a pair of concentric annular grooves 16. FIG. 2 shows that the grooves 16 are immediately adjacent to the internal and external annular surfaces of the gaskets. The gasket 9' is subjected to lesser pressure and is formed with axially extending ducts 17 which allow the liquid to flow to the upper side of the gasket 9', as the parts appear in FIGS. 1 and 2. A very important advantage of the ducts 17 is that they prevent the formation of a liquid film or layer between the washer 13 and gasket 9' so that all elements of the sealing package invariably remain in actual abutment with each other.

One side of each groove 16 is bounded by an annular lip 19 which is pressed inwardly or outwardly when the respective groove is filled with liquid whereby the lips 19 respectively bear against the internal surface of the cylinder 1 and against the periphery of the piston 6 to prevent or to reduce leakage of liquid toward the threads of the screw 5 and into the compartment 14. Liquid which leaks along the periphery of the stop 10 will escape through the radial bores 15 to indicate that the sealing action is unsatisfactory.

When the piston 6 is caused to penetrate into the cylinder chamber 1a, the annular sealing elements 9', 13, 9" remain in abutment with the stop 10 because the pressure of liquid 12 increases and such liquid bears against that portion of the gasket 9" which extends radially beyond the periphery of the stop flange 7c. As shown, the maximum diameter of the stop flange 7c is less than the internal diameter of the cylinder 1.

A second package 20 of annular sealing elements is provided between the periphery of the piston 6 and the internal surface of the screw 5 at the outer axial end of the bearing sleeve 11. The elements of this second package 20 may but need not be constructed in the same way as shown in FIG. 2. For example, the package 20 can be replaced by a conventional stuffing box. The pressure of liquid which happens to leak along the periphery of the piston 6 and/or along the periphery of the bearing sleeve 11 is greatly reduced so that the package 20 may be constructed and assembled to withstand relatively low pressures. As shown, in the internal surface of the screw 5 is provided with an annular recess 5a to accommodate a split ring or the like, such ring serving to keep the package 20 against axial movement in a direction away from the sleeve 11.

The liquid 12 fills the entire cylinder chamber 1a and the entire piston chamber 6a. When the piston 6 is compelled to penetrate deeper into the cylinder 1, the liquid undergoes compression and its volume decreases; however, the liquid will expand at a rate proportional with a reduction in pressure upon the piston. It is immaterial whether the piston 6 or the cylinder 1 is stationary, as long as at least one of these members is movable axially wiht reference to the other member.

Since the piston 6 is hollow, the liquid spring of FIG. 1 can accommodate a larger quantity of compressible liquid than a conventional spring of equal dimensions but having a solid rod-shaped piston. Such increased capacity of the liquid spring is desirable for obvious reasons, especially if the spring is used in certain types of machine tools such as stamping machines, presses and others.

FIG. 1 further shows an annular insert 21 which is removably accommodated in the cylinder chamber 1a. This insert 21 serves as a substitute for or it may be used in addition to the compression adjusting screw 5. Two or more such compression adjusting inserts may be placed into the cylinder chamber 1a to further reduce the overall quantity of entrapped liquid. The insert 21 rests on the bottom wall 1b and may also serve as a means for limiting the inward stroke of the piston 6.

It is clear that the insert or inserts 21 may be placed between the inner end face of the screw 5 and the ring-shaped stop 10. In such liquid springs, the screw 5 need not be adjustable in the axial direction of the cylinder 1 because the initial compression of entrapped liquid can be controlled by changing the number of inserts or by utilizing inserts which displace different quantities of liquid. In a way, the stop 10 also constitutes a compression regulating insert.

The screw 5 may be rigidly affixed to or it may form part of a stationary supporting structure 22 (indicated in FIG. 1 by phantom lines) so that the initial compression of entrapped liquid 12 may be regulated by rotating the cylinder 1 with reference to the supporting structure 22 and screw 5. Such construction is of particular advantage for liquid springs wherein the piston 6 and/or the cylinder 1 must perform a short stroke. The cylinder is then provided with facets, as at 1c, so that it may be engaged by a tool for rotation with reference to the screw 5. This screw is also provided with facets or with similar means enabling the operator to apply a tool which is used to rotate the screw in order to change the initial compression of liquid 12.

Figure 3:
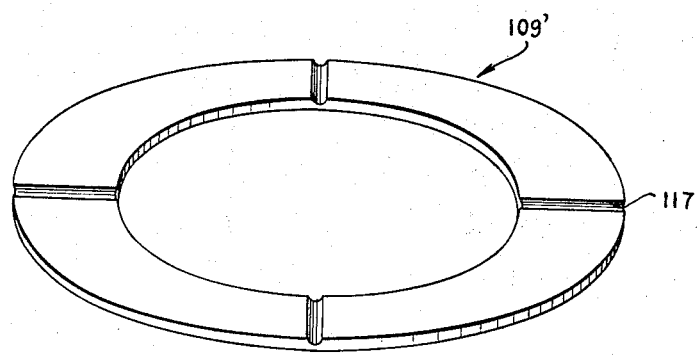
FIG. 3 is a perspective view of a modified sealing element.

FIG. 3 illustrates a modified annular gasket 109' whose upper side is formed with radially extending grooves 117. These grooves replace the ducts 17 in the gasket 9' and are provided at that side of the element 109' which faces away from the chamber in the cylinder. It is clear that the gasket 109' may be replaced by a sealing element one side of which is knurled, corrugated, ribbed or otherwise roughened to provide channels for leak fluid. Such channels will accommodate liquid which is squeezed from the gaps between the washer and the adjoining gaskets.

Figure 4:
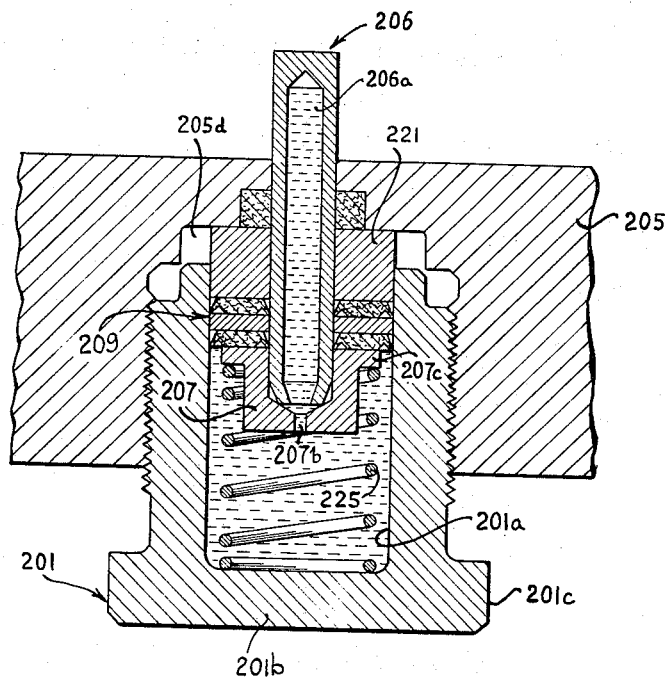
FIG. 4 is an axial section through another liquid spring.

Referring finally to FIG. 4, there is shown a further liquid spring which comprises a stationary supporting structure 205 having a tapped bore 205d which accommodates a cylinder 201. The cylinder 201 is provided with internal threads and meshes with the supporting structure 205. An annular compression adjusting or regulating insert 221 is provided at the bottom of the bore 205d and penetrates into the open end of the cylinder 201. If the cylinder 201 is rotated with reference to the supporting structure 205, the insert 221 will change the initial compression of liquid in the chamber 201a. The numeral 201c denotes facets provided around the bottom wall 201b. Such facets serve to facilitatae rotation of the cylinder by means of a wrench or another suitable tool.

The piston 206 has a chamber 206a which communicates with the chamber 201a through a passage 207b defined by a nozzle 207. This nozzle is press-fitted onto, rather than screwed into, the open inner end of the piston 206. The flange 207c of the nozzle 207 serves as one stop for a package 209 of sealing elements which is constructed in the same way as shown in FIG. 2. The stop 10 of FIG. 1 has been omitted because the package 209 abuts directly against the annular insert 221.

A helical expansion spring 225 is provided to operate between the flange 207c and the bottom wall 201b, and the purpose of this spring is to keep the nozzle 207 in abutment with the package 209 when the piston 206 is not forced to penetrate into the chamber 201a. In fact, and since the spring 225 is preferably inserted in pre-stressed condition, it insures that the open end of the piston 206 will remain in the nozzle 207 at all times despite the fact that such open end can be freely slidably mounted in the nozzle. The nozzle 207 will determine the maximum compression stroke of the piston 206.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A liquid spring, comprising a cylinder member having an open end and defining a liquid-filled chamber; a hollow piston member reciprocably extending into said cylinder member and having a liquid-filled chamber in communication with the chamber of said cylinder member; annular sealing means interposed between said members to at least reduce leakage of liquid from said chambers, at least one of said members being movable axially with reference to the other member to compress the liquid in said chambers; and at least one removable rigid insert provided in at least one of said chambers to determine the maximum amount of liquid in said chambers.

2. A liquid spring as defined in claim 1, wherein said insert is provided in the chamber of said cylinder member.

3. A liquid spring as defined in claim 1, wherein said piston member is movable with reference to said cylinder member and wherein said insert is located in the path of movement of said piston member.

4. A liquid spring, comprising a cylinder member having an open end and defining a liquid-filled chamber; a hollow piston member reciprocably extending into said cylinder member and having a liquid-filled chamber in communication with the chamber of said cylinder member, at least one of said members being movable axially with reference to the other member to compress the liquid in said chambers; a first annular stop telescoped into said cylinder member and slidably receiving an intermediate portion of said piston member; a second annular stop rigid with said piston member and located in the chamber of said cylinder member; and annular sealing means interposed between said members intermediate said stops to at least reduce leakage of liquid from said chambers, said sealing means comprising a plurality of annular gaskets and spacer means interposed between said gaskets, said gaskets having inner and outer portions respectively engaging the periphery of said piston member and the internal surface of said cylinder member.

5. A liquid spring as set forth in claim 4, wherein each of said gaskets has an inner side facing toward the chamber of said cylinder member and wherein the inner sides of said gaskets are provided with annular grooves each bounded by a flexible annular lip which abuts against one of said members.

6. A liquid spring as set forth in claim 4, wherein said sealing means comprises two gaskets and an annular washer consisting of metallic material and interposed between said gaskets, one of said gaskets being located nearer to the chamber of said cylinder member and the other gasket having at least one axially extending duct to permit outflow of liquid which happens to penetrate between said washer and said other gasket.

7. A liquid spring as set forth in claim 6, wherein said washer consists of a material selected from the group consisting of cast iron and sintered metal.

8. A liquid spring, comprising a cylinder member having an open outer end and defining a liquid-filled chamber; a hollow piston member reciprocably extending through the outer end of said cylinder member and defining a liquid-filled chamber, said piston member having an inner end provided with a passage connecting said chambers and said open end having a first annular stop, at least one of said members being movable axially with reference to the other member to compress the liquid in said chambers; a second annular stop fitted into said cylinder member between said first stop and said outer end and slidably surrounding a portion of said piston member; and annular sealing means interposed between said stops, said sealing means comprising a pair of annular gaskets seaingly engaging said members and a spacer located between said gaskets, each of said gaskets having a side facing away from the chamber of said cylinder member and at least one of said sides being provided with at least one substantially radially extending channel.

References Cited

UNITED STATES PATENTS

| 2,905,458 | 9/1959 | Mason | 267—1 |
| 2,957,712 | 10/1960 | Farmer | 188—100 |
| 3,131,938 | 5/1964 | Barry | 277—79 |

FOREIGN PATENTS 539,966   9/1941   Great Britain.

ARTHUR L. LA POINT, *Primary Examiner.*

R. M. WOHLFARTH, *Assistant Examiner.*